(12) United States Patent
Agarwalla et al.

(10) Patent No.: US 11,281,680 B2
(45) Date of Patent: *Mar. 22, 2022

(54) SCORING CANDIDATE EVIDENCE PASSAGES FOR CRITERIA VALIDATION USING HISTORICAL EVIDENCE DATA

(71) Applicant: INTERNATIONAL BUSINESS MACHINES CORPORATION, Armonk, NY (US)

(72) Inventors: Lalit Agarwalla, Bangalore (IN); Ankur Parikh, Rajkot (IN); Avinesh Polisetty Venkata Sai, Kakinada (IN)

(73) Assignee: International Business Machines Corporation, Armonk, NY (US)

( * ) Notice: Subject to any disclaimer, the term of this patent is extended or adjusted under 35 U.S.C. 154(b) by 290 days.

This patent is subject to a terminal disclaimer.

(21) Appl. No.: 16/544,240

(22) Filed: Aug. 19, 2019

(65) Prior Publication Data

US 2019/0370261 A1    Dec. 5, 2019

Related U.S. Application Data

(63) Continuation of application No. 15/162,689, filed on May 24, 2016, now Pat. No. 10,387,434, which is a continuation of application No. 14/955,204, filed on Dec. 1, 2015, now Pat. No. 10,311,065.

(51) Int. Cl.
*G06F 16/2457* (2019.01)
*G06F 16/35* (2019.01)
*G06F 16/33* (2019.01)

(52) U.S. Cl.
CPC .... *G06F 16/24578* (2019.01); *G06F 16/3344* (2019.01); *G06F 16/3346* (2019.01); *G06F 16/353* (2019.01)

(58) Field of Classification Search
CPC .......... G06F 16/24578; G06F 16/3344; G06F 16/353
See application file for complete search history.

(56) References Cited

U.S. PATENT DOCUMENTS

| 6,038,560 A | 3/2000 | Wical |
| 8,473,279 B2 | 6/2013 | Al-Shammari |
| 8,521,731 B2 | 8/2013 | Broder |

(Continued)

FOREIGN PATENT DOCUMENTS

EP    2104044 A1    9/2009

OTHER PUBLICATIONS

IBM, "List of IBM Patents or Patent Applications Treated as Related (Appendix P)," Aug. 22, 2019, p. 1-2.
Agarwalla et al., "Scoring Candidate Evidence Passages for Criteria Validation Using Historical Evidence Data," Application and Drawings, filed Aug. 19, 2019, 33 Pages, U.S. Appl. No. 16/543,956.

(Continued)

*Primary Examiner* — Grace Park
(74) *Attorney, Agent, or Firm* — Steven M. Bouknight

(57) ABSTRACT

Scoring candidate evidence passages for criteria validation. Evidence data associated with a criteria, such that the evidence data entries include a decision indicator indicating that the criteria is either met or not met by the evidence data, is collected. Candidate evidences, making up a corpus of data associated with the criteria, against which the criteria is to be validated, are generated. Each candidate evidence is evaluated against the evidence data. A score indicating the validity of the criteria with respect to the candidate evidence is generated, based on the decision indicators associated with the evidence data entries.

6 Claims, 3 Drawing Sheets

(56) References Cited

U.S. PATENT DOCUMENTS

| | | |
|---|---|---|
| 10,055,485 B2 | 8/2018 | Agarwalla |
| 10,311,065 B2 | 6/2019 | Agarwalla |
| 10,387,434 B2 | 8/2019 | Agarwalla |
| 2009/0077065 A1 | 3/2009 | Song |
| 2009/0287678 A1 | 11/2009 | Brown |
| 2010/0082333 A1 | 4/2010 | Al-Shammari |
| 2012/0078062 A1 | 3/2012 | Bagchi |
| 2013/0007055 A1 | 1/2013 | Brown |
| 2015/0161241 A1 | 6/2015 | Haggar |
| 2016/0147870 A1 | 5/2016 | Agarwalla |
| 2016/0147872 A1 | 5/2016 | Agarwalla |
| 2017/0154045 A1 | 6/2017 | Agarwalla |
| 2017/0154103 A1 | 6/2017 | Agarwalla |

OTHER PUBLICATIONS

Disclosed Anonymously, "Extensible Method for Criteria-Driven Answer Scoring in a Deep Question Answering System," ip.com, IP.com No. 000239037, IP.com Electronic Publication: Oct. 2, 2014, pp. 1-5.

Disclosed Anonymously, "Method of Computing Relevancy Score in a Question and Answering System," ip.com, IP.com No. 000222407, IP.com Electronic Publication: Oct. 2, 2012, pp. 1-4.

Pack et al., "The Use of Dynamic Segment Scoring for Language-Independent Question Answering," MIT Lincoln Laboratory, Proceedings of the HLT 2001, First International Conference on Human Language Technology Research, San Francisco, 2001, pp. 1-5.

Unified Medical Language Systems® (UMLS®), "Unified Medical Language System (UMLS)," http:f/www.nlm.nih.gov/research/umls/, Accessed on Jun. 10, 2015, pp. 1-1.

Wikipedia, "Query expansion," http://en.wikipedia.org/wiki/Query_expansion, Accessed on Jun. 10, 2015, pp. 1-2.

SCORING CANDIDATE EVIDENCE PASSAGES FOR CRITERIA VALIDATION USING HISTORICAL EVIDENCE DATA

BACKGROUND

The present invention relates generally to the field of information retrieval, and more particularly to scoring candidate evidence passages for criteria validation.

A criteria is a basis for making a judgement or a decision. A criteria validation system is a system in which a set of unstructured, or natural language, text criteria is validated or evaluated against another set of unstructured data, for example, a set of documents, to determine if the condition of the criteria is Met or Not Met in the unstructured data. The validation determines if the conditions of the criteria are found in the unstructured data content, and, if the conditions are met, the content is considered a match for the criteria, based on examination and analysis of the unstructured data content, which is sometimes referred to as evidence.

SUMMARY

Embodiments of the present invention disclose a method, system, and computer program product for scoring candidate evidence data for criteria validation. Evidence data associated with a criteria, such that the evidence data entries include a decision indicator indicating that the criteria is either met or not met by the evidence data, is collected. Candidate evidences, making up a corpus of data associated with the criteria, against which the criteria is to be validated, are generated. Each candidate evidence is evaluated against the evidence data. A score indicating the validity of the criteria with respect to the candidate evidence is generated, based on the decision indicators associated with the evidence data entries.

DETAILED DESCRIPTION

Embodiments of the present invention provide a method, computer program product, and computer system for scoring candidate evidences for a criteria validation system or policy advisor system, by using historical evidence data. A criteria text in a natural language is received. Historical evidence data associated with the criteria, including entries that indicate that the criteria is either met or not met, is collected. The historical evidence data is processed to convert numerical evidence data to normalized conditional expressions and negated text to normalized neutral text. Candidate evidences are generated from unstructured data content against which the criteria is to be evaluated. Each candidate evidence is evaluated against the historical evidence data. Numerical conditions in a candidate evidence are evaluated by normalizing and comparing them with normalized conditional expressions in the evidence data. A score (Met/Not Met/Missing) is generated for each candidate evidence.

A criteria or policy validation system refers to a system where a set of unstructured text criteria is validated against unstructured content for a Met or Not Met condition. For example, a criteria may be "person has previously traveled to the United States," which is to be validated for Met/Not Met against a text document containing the person's travel history. Another example, from the medical domain, may be "left ventricular ejection fraction less than 30%," which is to be validated against a patient's medical history to determine if the criteria is Met, Not Met, or Missing (indicating insufficient information to validate or reject the criteria).

Embodiments of the present invention use criteria-related unstructured data, referred to as historical evidence data. An example is manually labeled training data, which is commonly used in supervised machine learning of criteria or policy decision making functions.

Figure 1:
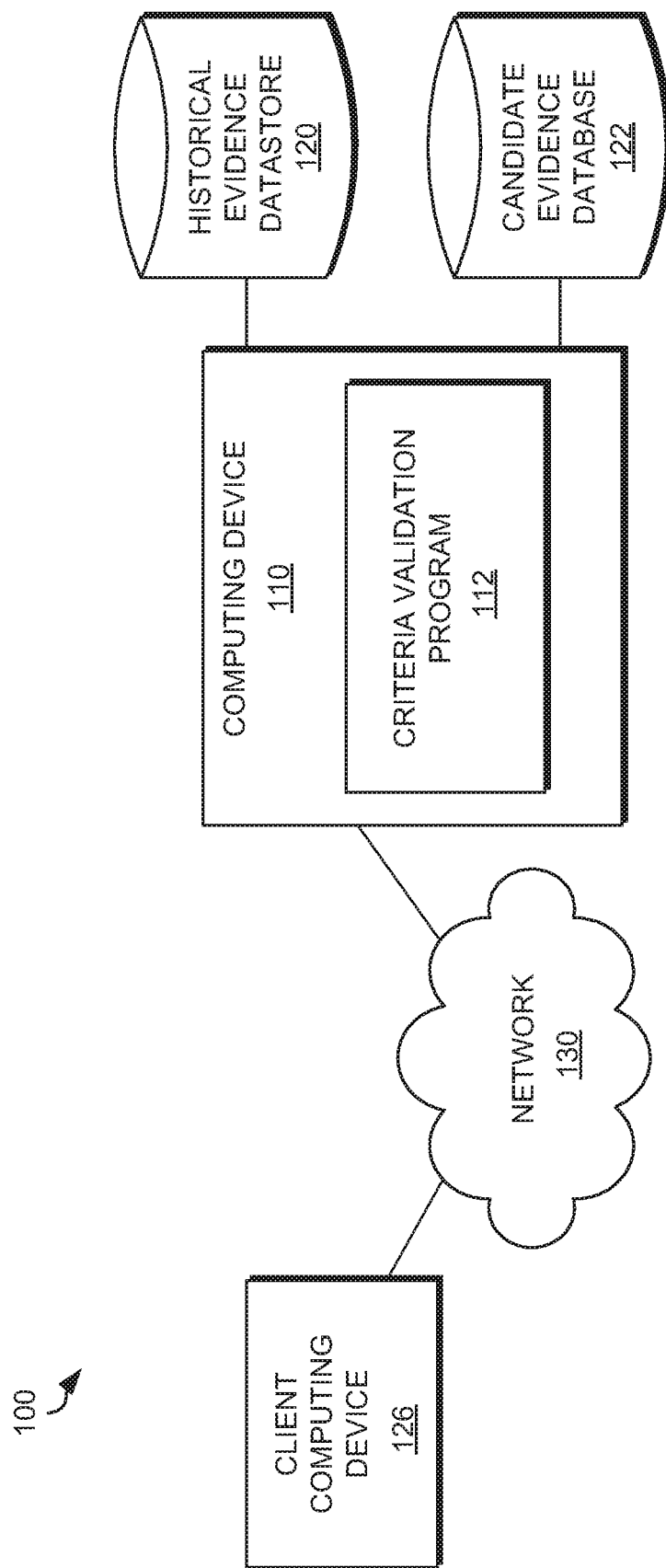
FIG. 1 is a functional block diagram illustrating a distributed data processing environment, in accordance with an embodiment of the present invention.

FIG. 1 is a functional block diagram illustrating distributed data processing environment 100, in accordance with an embodiment of the present invention. Distributed data processing environment 100 includes computing device 110, shown hosting criteria validation program 112, historical evidence datastore 120, candidate evidence database 122, and client computing device 126, all interconnected via network 130. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Network 130 can be, for example, a local area network (LAN), a telecommunications network, a wide area network (WAN), such as the Internet, a virtual local area network (VLAN), or any combination that can include wired, wireless, or optical connections. In general, network 130 can be any combination of connections and protocols that will support communications between computing device 110, historical evidence datastore 120, candidate evidence database 122, client computing device 126, and the operation of criteria validation program 112, in distributed data processing environment 100, in accordance with embodiments of the present invention.

Historical evidence datastore 120 is a collection of manually entered or automatically generated data, in accordance with an embodiment of the present invention. Historical evidence datastore may include data that has been collected over a period of time. In an embodiment of the present invention, the contents of historical evidence datastore 120 is used to validate criteria established for decision making. The stored data, referred to as historical evidence data, is sometimes used in the scoring of evidence. Evidence scoring is a technique used in machine learning to determine the likelihood that one instance of evidence meets certain criteria, or to determine a better instance of evidence among multiple instances. Historical evidence datastore 120 is unstructured data, generally text-based, and may be included in a database, or may be a file stored in a file storage device on a local or remote system. Historical evidence data is often associated with a criteria text that is predefined or constant, and includes evidence text that substantiates a machine-based decision, having a criteria decision indicator, or score, of Met or Not Met. For example, in the medical insurance field, approval by an insurance firm may require a validation that a patient meets certain criteria. The insurance approval/rejection decisions of the patient, along with selected evidence text from the patient's medical history, which may be manually generated by the insurance company over time, may function as historical evidence data. In an embodiment of the present invention, historical evidence datastore 120 may be used in conjunction with candidate evidence database 122 to generate a semantic relationship or inferred match of criteria in a criteria text.

A criteria text is unstructured data input that presents a criteria for validation. A criteria text is often input as a text passage that includes words or symbols as terms, or groups of words or symbols, as phrases. A criteria text may be input from a client computing device 126, such as a server computer, a mobile computing device, such as a laptop, a tablet, a smartphone or a personal digital assistant (PDA) device. A criteria text may be received by criteria validation program 112, residing on computing device 110, by network connection to network 130, as depicted in FIG. 1. In some embodiments of the present invention, a criteria text may be input directly to computing device 110, by an input device connected to computing device 110 (not shown), and received by criteria validation program 112.

Candidate evidence database 122 is a corpus of information and data associated with the general subject matter to which the criteria text is associated, and against which the criteria is to be validated. In one embodiment of the present invention, candidate evidence database 122 may be a single database, or a group of connected databases. In another embodiment, candidate evidence database 122 may be a searchable storage device that includes files and data. Candidate evidence database 122 may include term and phrase definitions, descriptions, and information semantically related to terms and phrases associated with the criteria text, and which may be used to decide the validity of the criteria. For example, in the medical insurance field, candidate evidence database 122 may include medical histories of various patients.

Computing device 110 may be a desktop computing device, a rack mounted computing device, a blade server, a management server, a mobile computing device, or any other electronic device or computing system capable of performing program instructions, and receiving and sending data. In other embodiments, computing device 110 may represent a computing system utilizing multiple computers as a server system, such as in a cloud computing environment. In yet other embodiments, computing device 110 can be a laptop computer, a tablet computer, a netbook computer, a personal computer (PC), a desktop computer, a personal digital assistant (PDA), a smart phone, or any programmable electronic device capable of communicating with historical evidence datastore 120 and candidate evidence database 122 via network 130. In another embodiment, computing device 110 can be a computing system utilizing clustered computers and components (e.g., database server computer, application server computers, etc.) that act as a single pool of seamless resources when accessed within distributed data processing environment 100. Computing device 110 may include internal and external hardware components, as depicted and described with reference to FIG. 3.

Computing device 110 is depicted as including criteria validation program 112, which includes machine instructions to perform a series of operations for evaluating and validating criteria, based on data in historical evidence datastore 120 and candidate evidence database 122.

Tables 1-5 illustrate the operation of criteria validation program 112, according to an embodiment of the invention, via an example in the medical domain. Various medical terms used therein are briefly described here. The QRS complex is a name for the combination of three of the graphical deflections seen on a typical electrocardiogram (EKG or ECG). It is usually the central and most visually obvious part of the tracing and represents ventricular depolarization. Cardiac dyssynchrony is a medical condition where the activation of different parts of the heart is improperly synchronized. Left bundle branch block (LBBB) is a cardiac conduction abnormality seen on the electrocardiogram. In this condition, activation of the left ventricle is delayed, which causes the left ventricle to contract later than the right ventricle, leading to an increased QRS duration, i.e., a wide QRS. Atrial fibrillation is an abnormal heart rhythm characterized by rapid and irregular beating. Paroxysmal, or intermittent, atrial fibrillation, generally only lasts for a relatively short time. Atrial fibrillation is usually correlated with a narrow QRS.

Table 1 presents an example of criteria evaluation and validation in a medical insurance approval scenario, in accordance with an embodiment of the invention. The example medical criteria text, referred to as C1, includes the text: (the patient) "has cardiac dyssynchrony, which is defined as a QRS duration greater than 120 ms." Criteria C1 is to be validated against a patient's medical history. Historical evidence data associated with criteria C1 is shown in column 2. Column 2 shows an example list of evidence text, with entries numbered 1 to 8, collected from historical evidence datastore 120, in accordance with an embodiment of the present invention. The evidence list includes multiple entries of evidence text data contained in the example historical evidence data. For example, evidence no. 1 includes key text terms found in the text of criteria C1, such as "QRS" and "duration"; however, the numerical value of "88" is not greater than 120 (milliseconds), so criteria C1 is Not Met by evidence no. 1.

Evidence no. 2 in Table 1 includes a value "136", which is greater than the criteria value of 120 (ms). Evidence no. 6 includes the term QRS, a greater-than symbol, the value "120", and the term "ms", and is thus considered to have met criteria C1. Evidences no. 3 and no. 4 include text phrases that do not match the terms and phrases in criteria text C1, although the decision for no. 3 is Not Met and the decision for no. 4 is Met.

TABLE 1

| HISTORICAL EVIDENCE DATA FOR CRITERIA C1 | | |
|---|---|---|
| NO. | EVIDENCE DATA | DECISION |
| 1 | QRS duration 88 | Not Met |
| 2 | QRSd interval 136 | Met |
| 3 | paroxysmal atrial fibrillation | Not Met |
| 4 | left bundle branch block | Met |
| 5 | QRS duration less than 120 ms | Not Met |
| 6 | (QRS > 120 ms) | Met |
| 7 | QRSd of 154 ms | Met |
| 8 | QRS duration is 156 milliseconds | Met |

Table 2 presents examples of candidate evidences for four hypothetical patients, each list containing two candidate evidences, generated by criteria validation program 112 from unstructured content in candidate evidence database 122, in accordance with an embodiment of the present invention.

TABLE 2

INITIAL LIST OF CANDIDATE EVIDENCES

| PATIENT | CANDIDATE EVIDENCE |
|---|---|
| Patient1 | There are instances of documented left bundle branch block |
| | Patient underwent cardiac surgery 2 years ago |
| Patient2 | Patient does not have any paroxysmal atrial fibrillation |
| | At time of insertion of pacing cardioverter-defibrillator or pacemaker |
| Patient3 | Patient has symptoms of bundle branch block |
| | QRS testing is done |
| Patient4 | Patient has chronic systolic and diastolic congestive heart failure |
| | QRSd is 130 ms |

Each of the candidate evidences for a patient needs to be scored as Met, Not Met, or Missing (indicating insufficient information to validate or reject the criteria). The scores may be used in a final evaluation of criteria C1. The historical evidence data in Table 1 is processed to generate conditional expressions for any numerical comparisons. For each row in Table 1 that has a numerical comparison, the normalized numerical value in the row is compared with any corresponding numerical values in the criteria text. For example, the QRS-related numerical value in criteria C1 is 120 ms. The evidence text is converted to a conditional expression, as shown in Table 3, with relation to the criteria text value. That is, it is converted as <, >, =, etc.

TABLE 3

EVIDENCE DATA AFTER NORMALIZATION AND CONVERSION

| NO. | EVIDENCE TEXT | CONVERTED EVIDENCE TEXT | DECISION |
|---|---|---|---|
| 1 | QRS duration 88 | QRS duration < 120 ms | Not Met |
| 2 | QRSd interval 136 | QRSd interval > 120 ms | Met |
| 3 | paroxysmol atrial fibrillation | paroxysmol atrial fibrillation | Not Met |
| 4 | left bundle branch block | left bundle branch block | Met |
| 5 | QRS duration less than 120 ms | QRS duration < 120 ms | Not Met |
| 6 | (QRS > 120 ms) | QRSd > 120 ms | Met |
| 7 | QRSd of 154 ms | QRSd > 120 ms | Met |
| 8 | QRS duration is 156 | QRS duration > 120 milliseconds | Met |

In order to score candidate evidences, each candidate evidence is compared with the converted evidence data in Table 3. Candidate evidences in Table 2 are first processed to remove any negation, to make them neutral. In addition, any numerical comparisons are converted to conditional expressions, based on numerical conditions present in the criteria text. Table 4 shows the result of processing candidate evidences in this manner. For example, the first candidate evidence for Patient 2 has been negated.

For each patient in Table 4, each of the candidate evidences is compared with every row in Table 3. If any row in Table 3 shows a high degree of sentence/semantic similarity with a candidate evidence, based on some similarity measure, then the decision of historical evidence data entry, from column 3 in Table 3, is chosen. For example, if the candidate evidence matches with a row in Table 3 having a Met decision, the score chosen for the candidate evidence may be Met=1, NotMet=0, Missing=0. If the candidate evidence has a numerical condition, then it is compared with rows in Table 3 having a conditional expression. The operand is checked for a match with the candidate evidence, and if it matches, a test is made to determine if it satisfies the numerical condition. If the numerical condition is satisfied, the score chosen for the candidate evidence is the decision for the historical evidence from Table 3, column 3. If the numerical condition is not satisfied, the score chosen for the candidate evidence is the negation of the decision for the historical evidence from Table 3. For example, Met is converted to NotMet. If only part of the main operand matches, or a numerical value is missing, then the score is set to Missing=1. If a candidate evidence does not include a numerical condition and does not match any rows in Table 3, or it matches only partially, then it is scored as Missing=1. In case of partial semantic matches, a fuzzy score (between Met and NotMet) may also be used.

TABLE 4

NORMALIZED LIST OF CANDIDATE EVIDENCES

| PATIENT | CANDIDATE EVIDENCE (NORMALIZED) |
|---|---|
| Patient1 | There are instances of documented left bundle branch block |
| | Patient underwent cardiac surgery 2 years ago |
| Patient2 | Patient has paroxysmal atrial fibrillation |
| | At time of insertion of pacing cardioverter-defibrillator or pacemaker pulse generator |
| Patient3 | Patient has symptoms of bundle branch block |
| | QRS testing is done |
| Patient4 | Patient has chronic systolic and diastolic congestive heart failure |
| | QRSd = 130 ms |

If the score for a candidate evidence is Met=1 and the candidate evidence passage was negated, then the score is changed accordingly. For example, Met=1 is converted to NotMet=1. However, in case the score is NotMet=1 and the candidate evidence passage was negated, it is not possible to infer that the score should be Met=1. In this case, it may be scored as Missing=1, or a fuzzy score may be used. However, if the evidence is a numerical expression, then the negation of NotMet should be Met.

This process is illustrated in Table 5, which shows the final Met/NotMet/Missing scores.

TABLE 5

METHOD DESCRIPTION

| PATIENT | CANDIDATE EVIDENCE | SCORE | COMMENTS |
|---|---|---|---|
| Patient1 | There are instances of documented left bundle branch block | Met = 1<br>NotMet = 0<br>Missing = 0 | "left bundle branch block" matches completely in Table 3, row 4 |

TABLE 5-continued

METHOD DESCRIPTION

| PATIENT | CANDIDATE EVIDENCE | SCORE | COMMENTS |
|---|---|---|---|
| | Patient underwent cardiac surgery 2 years ago | Met = 0<br>NotMet = 0<br>Missing = 1 | No match with anything in Table 3 |
| Patient2 | Patient has paroxysmal atrial fibrillation | Met = 0<br>NotMet = 0<br>Missing = 1 | The sentence was negated. "paroxysmal atrial fibrillation" matches completely in Table 3, row 3. The decision in Table 3 for this evidence is NotMet = 1. Due to negation of NotMet, the score becomes Missing = 1 (a fuzzy score may also be used) |
| | At time of insertion of pacing cardioverter-defibrillator or pacemaker pulse generator | Met = 0<br>NotMet = 0<br>Missing = 1 | No match with anything in Table 3 |
| Patient3 | Patient has symptoms of bundle branch block | Met = 0<br>NotMet = 0<br>Missing = 1 | Partial match of "bundle branch block" in Table 3 |
| | QRS testing is done | Met = 0<br>NotMet = 0<br>Missing = 1 | Partial match |
| Patient4 | Patient has chronic systolic and diastolic congestive heart failure | Met = 0<br>NotMet = 0<br>Missing = 1 | No match |
| | QRSd = 130 ms | Met = 1<br>NotMet = 0<br>Missing = 0 | This is a numerical condition. This matches with the condition in Table 3, row 7. |

Figure 2:
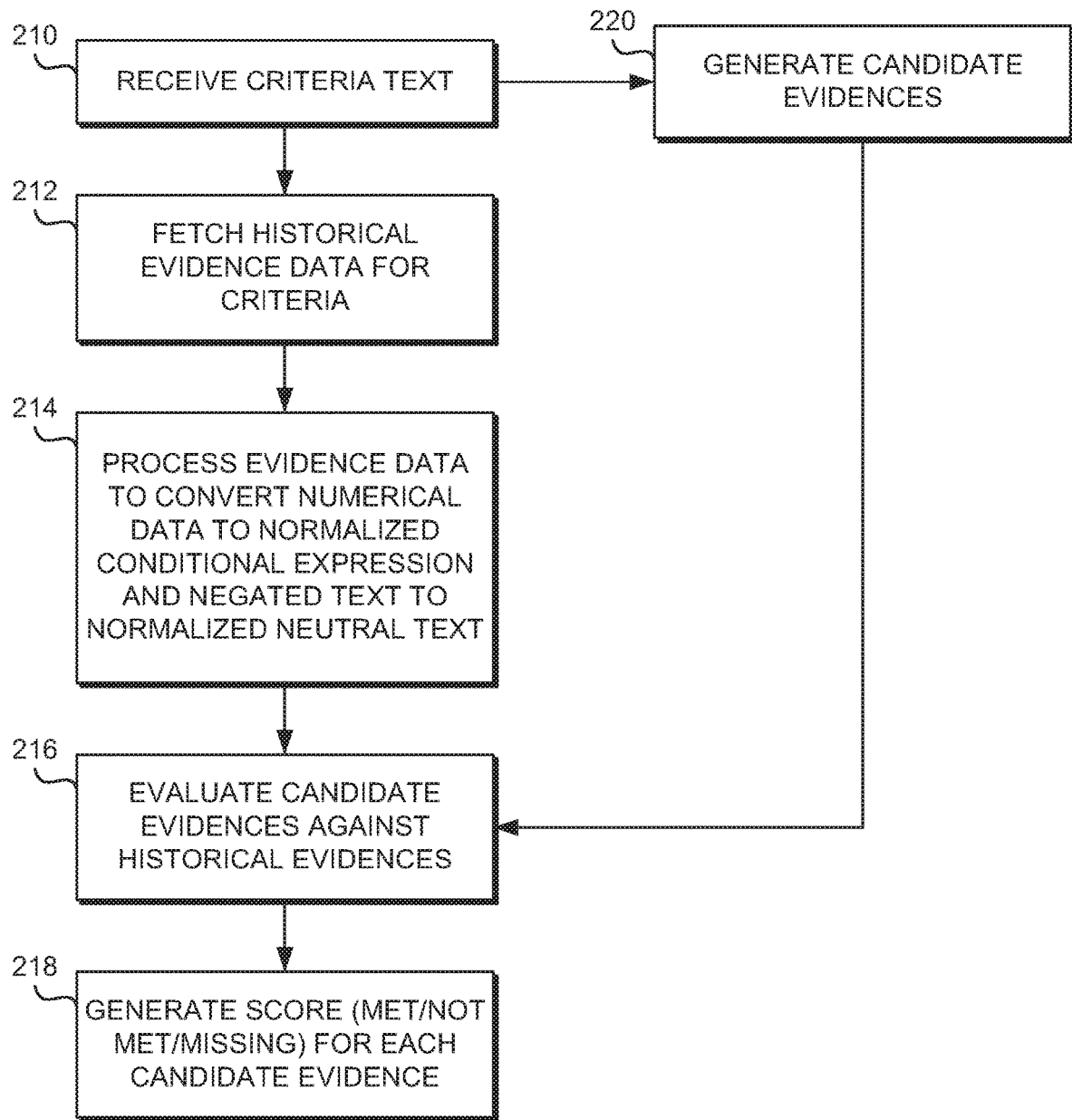
FIG. 2 is a flowchart depicting various steps performed by a criteria validation program operating on a computing device in the distributed data processing environment of FIG. 1, in accordance with an embodiment of the present invention.

FIG. 2 is a flowchart depicting various operational steps performed by criteria validation program 112, operating on computing device 110 within the distributed data processing environment of FIG. 1, in accordance with an embodiment of the present invention. Criteria validation program 112 performs the operations described above as illustrated in Tables 1-5. Criteria validation program 112 makes use of an existing criteria text, such as criteria text C1. Existing criteria-relevant, unstructured data, such as is stored in historical evidence datastore 120, which is historical evidence used in criteria validation decision-making algorithms, and semantic relationship information included in candidate evidence database 122, also support the operational performance of criteria validation program 112. Some embodiments of the present invention, such as shown in the example discussed above, make use of unstructured data that includes historical evidence data that has medical subject matter. The historical evidence data may have been developed for other purposes, such as in developing a machine learning model, but is used by criteria validation program 112 to validate the criteria text. Reference to the historical evidence data for purposes of describing embodiments of the present invention in the context of an example, should not be construed as limiting, as implementations using other unstructured data sources are possible.

Referring now to the operations depicted in FIG. 2, criteria validation program 112 may receive a criteria text (step 210). For example, a criteria text may be a statement such as criteria C1, given above. The criteria text may be received from an input source. For example, the criteria text may have been sent from client computing device 126 via network 130 to computing device 110 and be received by criteria validation program 112. In an embodiment of the invention, the received criteria text may be for a medical criteria validation system used by a medical insurance carrier. For example, the received medical criteria text may be (the patient) " . . . has cardiac dyssynchrony; defined as QRS duration greater than 120 ms".

Criteria validation program 112 may access unstructured data from historical evidence datastore 120, which may have been generated for some other purposes, but is related to the subject matter of the received criteria text. From the unstructured data, criteria validation program 112 may receive historical evidence data used for criteria validation (step 212). For example, historical evidence data may include data as presented for criteria C1 in Table 1. In various embodiments of the present invention, in which a criteria validation system is trained for decision making using criteria that includes text-based terms and phrases, historical evidence data for the validation system is available and includes terms and phrases related to the subject of the criteria. For example, historical evidence datastore 120 may include multiple instances of historical evidence data used as training data for a decision making system. For example, the historical evidence data related to the criteria text: (the patient) " . . . has cardiac dyssynchrony; defined as QRS duration greater than 120 ms", may include the evidence text shown in Table 1. In some embodiments of the present invention, criteria validation program 112 accesses and fetches the historical evidence data. In other embodiments, criteria validation program 112 requests the historical evidence data from historical evidence datastore 120, and receives the historical evidence data via network 130.

Criteria validation program 112 may process the historical evidence data to convert any numerical data to normalized conditional expressions, based on numerical conditions in the criteria text, and negated text to normalized neutral text (step 214). For example, an instance of historical evidence data in Table 1, may include evidence no. 1, "QRS, duration 88," which may be converted to "QRS duration<120 ms." Another instance of historical evidence data is evidence no. 6, "(QRS>120 ms)." This may be converted to the normalized conditional expression "QRSd>120 ms," while evidence no. 5, "QRS duration less than 120 ms," may be converted to "QRS duration<120 ms."

Criteria validation program 112 generates candidate evidences from unstructured data in candidate evidence database 122 (step 220). Candidate evidences may include text passages that may be used to substantiate a decision as to the validity of the criteria. Candidate evidences are processed to remove any negation and to make them neutral. For example, the statement "Patient does not have any paroxysmal atrial fibrillation" is converted to "Patient has paroxysmal atrial fibrillation." In addition, any numerical comparisons are converted to conditional expressions, based on numerical conditions in the criteria text. Each candidate evidence is evaluated against all of the historical evidence data (step 216). A score, indicating the validity of the criteria with respect to the candidate evidence, based on the decision indicators associated with the evidence data entries (step 218). If any historical evidence data shows a high degree of sentence/semantic similarity with a candidate evidence, then the same decision as that of the historical evidence is chosen. For this purpose, techniques of natural language processing (NLP), as implemented in various proprietary and open-source software packages, may be applied. If the candidate evidence has a numerical condition, then it is compared with historical evidence having a conditional expression. The operand is checked for a match with a candidate evidence, and if it matches, a test is made to determine if it satisfies the numerical condition. If the numerical condition is satisfied, the decision for that historical evidence is chosen. If the numerical condition is not satisfied, the decision for that historical evidence is negated, for example, Met is converted to NotMet. If only part of the main operand matches, or a numerical value is missing, then the score is set to Missing. If a candidate evidence in not a numerical condition and does not match any historical evidence, or if it matches only partially, then it is scored as Missing. In case of partial semantic matches, a fuzzy score may also be used. A fuzzy score corresponds to a value between met and not met, representing a likelihood of a match.

Figure 3:
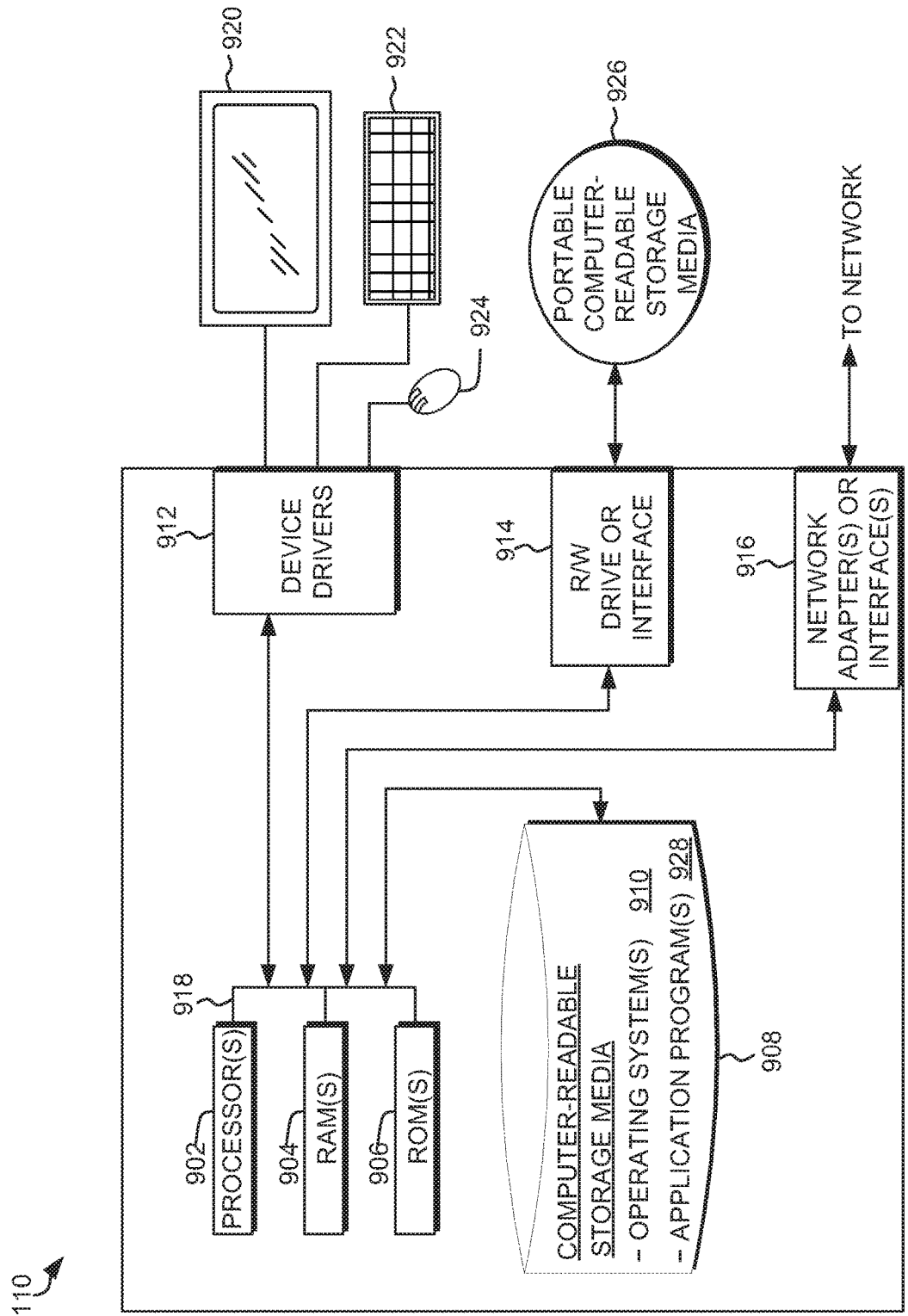
FIG. 3 depicts a block diagram of components of a computing device capable of executing the criteria validation program, in accordance with an embodiment of the present invention.

FIG. 3 depicts a block diagram of components of a computing device 110, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, criteria validation program 112, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 928 on computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 928 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for scoring candidate evidence data for criteria validation, the method comprising:
    collecting, by a computer, evidence data, comprising one or more evidence data entries, associated with a criteria, wherein an evidence data entry includes a decision indicator indicating that the criteria is either met or not met by the evidence data entry;
    generating, by the computer, candidate evidences, comprising a corpus of data associated with the criteria, against which the criteria is to be validated;
    evaluating, by the computer, a candidate evidence against the evidence data; and
    generating, by the computer, a score indicating a validity of the criteria with respect to the candidate evidence, based on the decision indicators associated with the evidence data entries, wherein the score corresponds to one of Met, Not Met, or Missing;
converting negated text in the evidence data entries to neutral text;
converting negated text in the candidate evidence to neutral text;
negating the respective decision indicators associated with the negated evidence data entries; and
in case a candidate evidence is negated, changing a score corresponding to Met to a score corresponding to Not Met, and a score corresponding to Not Met to a score corresponding to Missing.

2. A method in accordance with claim 1, wherein the criteria comprises a text passage for validation.

3. A method in accordance with claim 1, further comprising:
normalizing, by the computer, the evidence data, and
wherein generating, by the computer, candidate evidences comprises generating normalized candidate evidences, and
wherein evaluating, by the computer, a candidate evidence comprises evaluating a normalized candidate evidence against the normalized evidence data, and
wherein generating, by the computer, a score comprises indicating a validity of the criteria with respect to the normalized candidate evidence, based on the decision indicators associated with the normalized evidence data entries.

4. A method in accordance with claim 3, wherein normalizing, by the computer, the evidence data comprises at least one of:
converting numerical data in an evidence data entry to conditional data, based on numerical conditions in the criteria; and
converting negated text in an evidence data entry to neutral text.

5. A method in accordance with claim 3, wherein generating, by the computer, normalized candidate evidences comprises:
selecting entries from the corpus; and
converting numerical data in the entries to conditional data and negated text to neutral text.

6. A method in accordance with claim 1, wherein evaluating, by the computer, a candidate evidence against the evidence data comprises establishing a degree of similarity between the candidate evidence and one or more evidence data entries, based on a predefined similarity measure.

\* \* \* \* \*